United States Patent [19]

Slonaker et al.

[11] 4,055,406
[45] Oct. 25, 1977

[54] APPARATUS FOR MAKING GLASS FIBERS MATERIAL

[75] Inventors: Robert O. Slonaker, Pataskala; Jack L. Emerson, Newark, both of Ohio

[73] Assignee: Owens-Corning Fiberglas Corporation, Toledo, Ohio

[21] Appl. No.: 731,196

[22] Filed: Oct. 12, 1976

[51] Int. Cl.² ........................................... C03B 37/02
[52] U.S. Cl. ..................................... 65/11 W; 65/12; 65/355
[58] Field of Search .................. 65/1, 2, 11 R, 11 W, 65/12, 355

[56] References Cited

U.S. PATENT DOCUMENTS 3,251,665  5/1966  Bour .................................... 65/12 X
3,334,981  8/1967  Glaser ................................... 65/12

FOREIGN PATENT DOCUMENTS

1,079,099  8/1967  United Kingdom ..................... 65/12

Primary Examiner—Robert L. Lindsay, Jr.
Attorney, Agent, or Firm—Ronald C. Hudgens; Kenneth H. Wetmore; Harry O. Ernsberger

[57] ABSTRACT

The disclosure embraces a support arrangement for a stream flow section or area of a feeder or bushing adapted to flow a large number of streams of glass or other fiber-forming mineral material for attenuation to fibers or filaments wherein the support arrangement includes a tubular support means for the stream flow section connected with transversely arranged tubular members adapted to be attached to a mounting frame, the tubular means and members accommodating circulating cooling fluid for conveying away heat from an area of the feeder floor to eliminate sagging of the feeder floor section and to promote thermal stability of the heat-softened glass throughout the area of the feeder floor.

13 Claims, 13 Drawing Figures

APPARATUS FOR MAKING GLASS FIBERS MATERIAL

The invention relates to apparatus for processing heat-softenable mineral material, such as glass, and more particularly to apparatus supporting and stabilizing a feeder for feeding a large number of streams of glass for attenuation to continuous fibers or filaments.

Continuous fibers or filaments of glass have been made and formed into strands and yarns particularly usable in the production of fabrics and other purposes. The trend in the production of continuous filaments attenuated from glass streams is to increase the number of filaments attenuated from streams flowing from a stream feeder and where many hundreds of filaments are formed from streams flowing from a single feeder, the stream flow area of the feeder or bushing is of comparatively large area.

Under the influence of the intense heat of the glass the feeder floor, which is usually fashioned of an alloy of platinum and rhodium, tends to warp or sag, a condition which adversely affects the production of continuous filaments of uniform size and characteristics. In the use of stream feeders or bushings having a large orifice area it becomes necessary to support the bushing in a manner to minimize sagging and warpage.

The U.S. Pat. No. 3,334,981 to Glaser discloses support means for such a feeder or bushing. In the disclosure of this patent the support means comprises a tube having specially configurated depending end regions to avoid interference with the terminal lugs at the ends of the feeder or bushing which are connected to a source of electrical energy for heating the glass. In such arrangement the configurated end regions of the tube are mounted by a downwardly extending mounting means, a construction which is very costly.

The present invention embraces a tubular support arrangement for a glass stream feeder or bushing floor section or stream flow area wherein the end regions of a tubular support means are connected with intermediate regions of laterally arranged tubes for conveying a cooling fluid through the tubular support means to eliminate sagging or warpage of the feeder floor.

Another object of the invention resides in a tubular metal support member for a stream feeder floor section wherein the support member is configurated to accommodate a body of refractory disposed between the tubular member and the feeder floor section, the refractory being in the form of a rod preferably of circular cross section for electrically insulating the tubular metal member from the feeder floor.

Another object of the invention resides in a tubular support arrangement for a glass stream feeder or bushing floor accommodating circulating cooling liquid wherein the tubular support arrangement is fashioned of metal alloy of a character tending to reduce the deposition of solid matter or scale on the interior of the tubular support arrangement resulting from precipitation of additives in the liquid.

Another object of the invention resides in a tubular support arrangement for a glass stream feeder or bushing floor wherein the arrangement comprises tubular components which are commercially available so that the support arrangement may be fabricated without the use of special tools and at a greatly reduced cost.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

While the apparatus of the invention has particular utility in association with a feeder or bushing from which flow streams of heat-softened glass for attenuation into fibers or filaments, it is to be understood that the apparatus may be utilized with feeders for flowing streams of other fiber-forming mineral materials.

Figure 1:
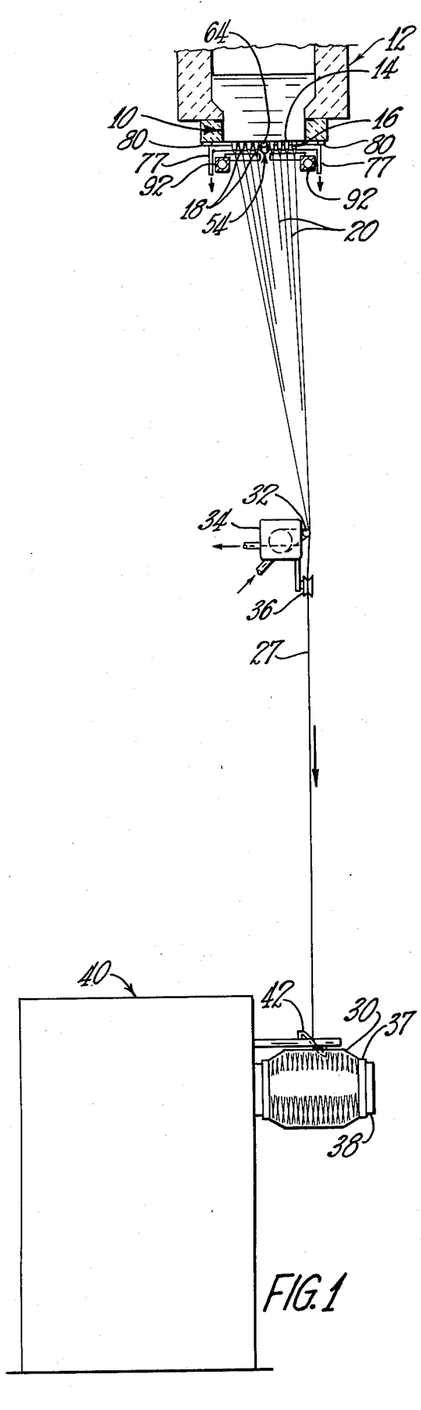
FIG. 1 is a semischematic side elevational view of an arrangement for processing streams of glass into continuous fibers or filaments.
Figure 2:
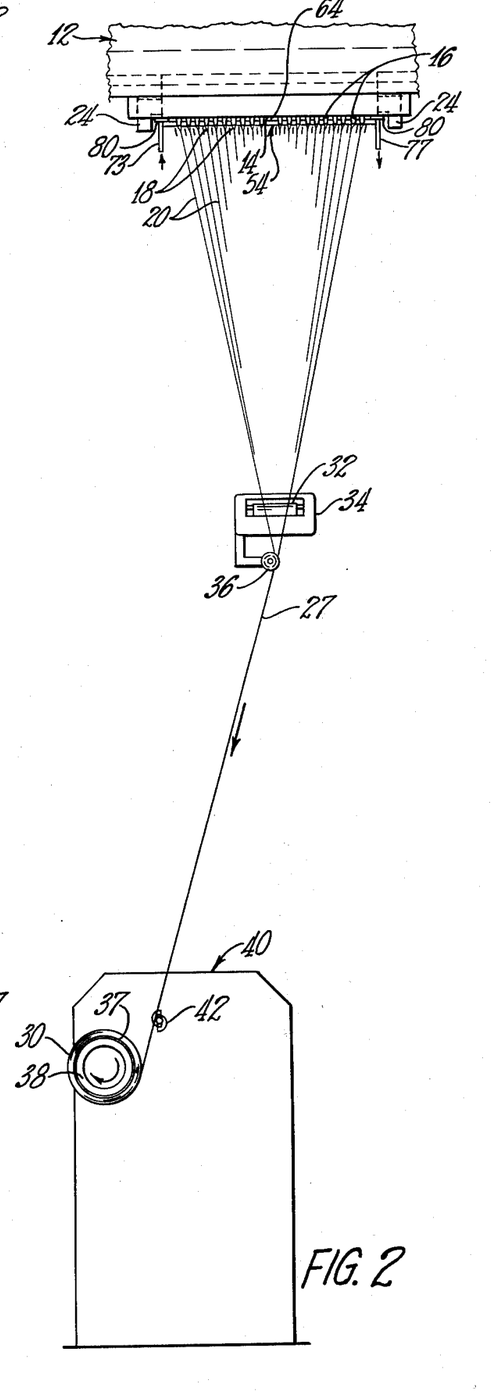
FIG. 2 is a front elevational view of the apparatus illustrated in FIG. 1.

Referring to the drawings in detail and initially to FIGS. 1 and 2, a stream feeder or bushing and support means of the invention are illustrated in combination with a conventional arrangement for attenuating streams of glass delivered from the feeder or bushing into continuous filaments and collecting a strand or group of the filaments in a wound package. The arrangement or apparatus is inclusive of a stream feeder or bushing 10 which is arranged to be supplied with and contain heat-softened fiber-forming mineral material, such as glass, and from which flow streams of the glass for attenuation to continuous filaments or fibers particularly for textile uses.

The feeder or bushing 10 is connected with a forehearth 12 arranged to receive refined heat-softened glass from a melting furnace (not shown). The feeder 10 may be associated with an arrangement wherein spheres or marbles of prerefined glass are melted in a receptacle above the feeder and the molten glass delivered into the feeder. The feeder 10 has a feeder floor section or bottom wall 14 provided with a substantial number of depending tips or projections 16 having orifices through which flow streams 18 of glass which are attenuated to continuous filaments or fibers 20.

Figure 3:
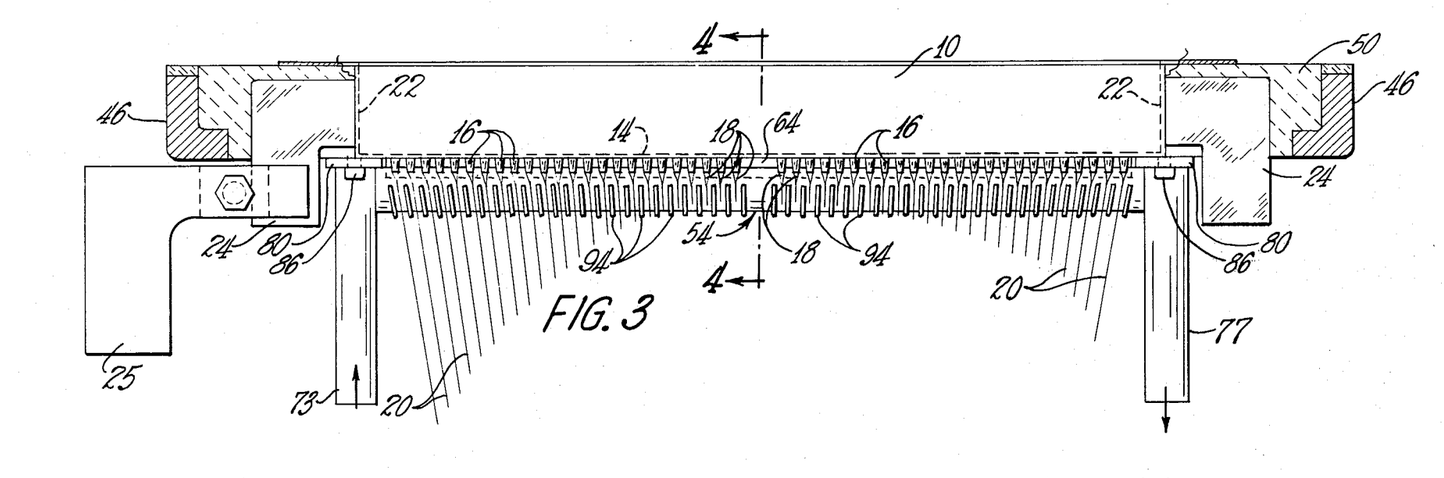
FIG. 3 is an elevational view of the stream feeder and support means, certain portions being shown in section for purposes of illustration.

The stream feeder or bushing 10 is preferably fashioned of an alloy of platinum and rhodium or other material which will withstand the temperatures of molten glass, the end walls 22 of the feeder being provided with terminals or lugs 24 to which are secured connectors or clamps 25, one of which is shown in FIG. 3, for connection with a supply of electric current to maintain the molten glass in the stream feeder at a proper temperature.

The glass streams are attenuated into continuous filaments 20 by winding a strand or group 27 of the filaments into a package 30 on a conventional winding machine. As shown in FIGS. 1 and 2, the filaments 20 are engaged with an applicator 32 of conventional construction whereby a lubricant, size or other coating material within a container or receptacle 34 is applied to the filaments by the applicator.

The filaments are converged into a strand or group 27 by a gathering device or shoe 36 and the strand or group 27 wound upon a rotating collector, tube or sleeve 37 mounted upon a collet 38 rotated by motive means (not shown) of a conventional winding machine 40. During winding of the strand 27 upon the collector 37, the strand is transversed lengthwise of the collector by a rotatable and reciprocable traverse means 42 of conventional construction.

Figure 4:
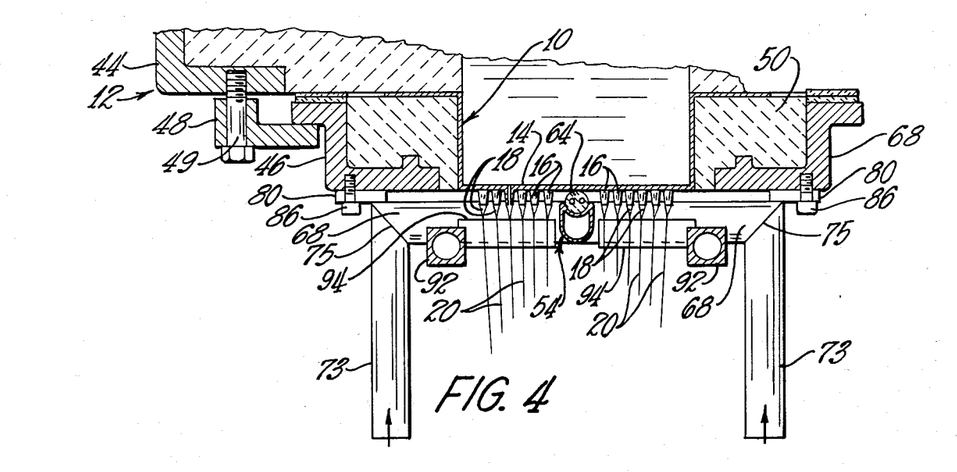
FIG. 4 is a transverse sectional view taken substantially on the line 4—4 of FIG. 3.

The stream feeder, its mounting frame means and the floor section supporting and cooling means are illustrated in detail in FIGS. 3 through 8. The forehearth 12 is of refractory material supported in a conventional manner by structural members 44, one of which is shown in FIG. 4. The stream feeder or bushing 10 is mounted by a frame 46 which is supported by lugs 48, one of which is shown in FIG. 4. Each lug receives a bolt 49 threaded into a forehearth structural member 44.

The stream feeder 10 is of rectangular shape and the mounting frame 46 therefor is of similar rectangular shape. Disposed between the side and end walls of the feeder 10 and portions of the mounting frame 46 is refractory 50 to minimize heat loss from the glass in the stream feeder 10, the glass flow channel in the forehearth 12 being in communication with the stream feeder.

The feeder floor section 14 is provided with several hundred orificed projections which necessitates a floor section of substantial area. Under the intense heat of the molten glass or other fiber-forming mineral material, the central region of the feeder floor or floor section 16 tends to warp or sag, a condition which promotes unstable laminar flow of the glass in the region adjacent the feeder floor. The invention is inclusive of a support means having a tubular means or hollow body disposed lengthwise of and beneath the floor section of the stream feeder through which cooling fluid is circulated to minimize or reduce distortion or sagging of the floor section.

An important factor in producing attenuated filaments of substantially uniform size and character resides in flowing streams of glass of the same size and of uniform viscosity at all of the orifices. It is essential that a fluid or liquid be circulated through a support means in order to prevent sagging of the support means and the feeder floor. The support means assembly is attached to the corner regions of the rectangular mounting frame for the stream feeder in order to stabilize the elongated tubular body or support means.

The support means and the circulating cooling liquid function as a heat sink, the circulating liquid conveying away or dissipating excess heat at a controlled rate from the region of the feeder floor section adjacent the support means so as to promote stability of the temperature and viscosity of the glass throughout the area of the feeder floor section. The tubular support means must be maintained out of direct contact with the metal of the feeder floor section by suitable refractory which is a nonconductor of electric energy so as not to modify the electric energy flow through the stream feeder.

A form of the feeder floor support means of the invention is particularly illustrated in FIGS. 3 through 8. Disposed beneath and extending lengthwise of the stream feeder 10 is a tubular or hollow support means, member or body 54 which, as shown in FIG. 4, extends lengthwise at a central region of the feeder floor section 14 and between groups of orificed projections 16 depending from the floor section 14. As particularly shown in FIG. 5, the tubular body or support means 54 has its greater dimension in a vertical direction.

Figures 5, 6, 8, 9, 10, 11:
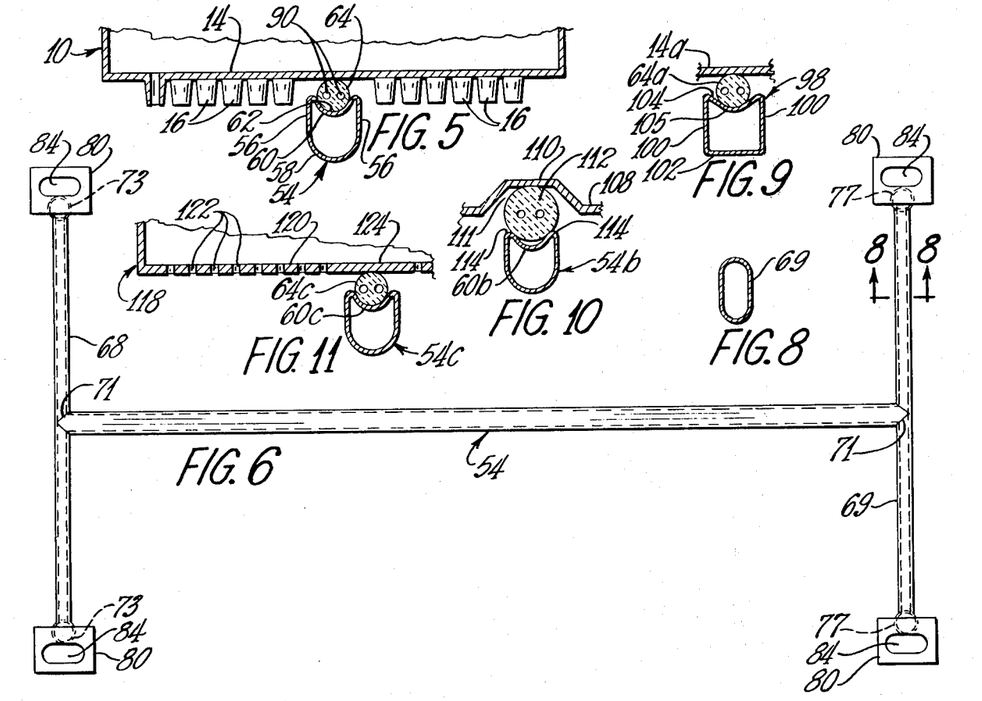
FIG. 5 is an enlarged fragmentary transverse sectional view through the stream feeder illustrating a form of feeder floor support means of FIG. 4.
FIG. 6 is a plan view of a form of the support means of the invention.
FIG. 8 is a detail sectional view taken substantially on the line 8—8 of FIG. 6.
FIG. 9 is a fragmentary sectional view illustrating another form of feeder floor support means.
FIG. 10 is a fragmentary sectional view illustrating the feeder floor support with a modified feeder floor construction.
FIG. 11 is a fragmentary transverse sectional view illustrating the feeder floor support with another form of feeder floor construction.

The side walls 56 of the tubular means or body 54 are substantially parallel and are connected at the lower region with an arcuate portion 58. The upper portion 60 connecting the side walls 56 is of inwardly directed arcuate configuration forming a recess or depression 62. The tubular means 54 extends substantially full length of the stream feeder floor. Disposed in the recess or depression 62 of the tubular means 54 is a body, rod or member 64 of refractory or other high temperature resistant nonmetallic material. The rod 64 is coextensive with the support means 54 and is in supporting engagement with the central region of the feeder floor section 14.

As particularly shown in FIG. 6, the respective ends of the tubular support means 54 are joined with intermediate regions of transversely or laterally extending tubular members or tubes 68 and 69. The respective ends of the support means or body 54 are shaped or mitered to fit into a notch 71 in each of the members 68 and 69, the ends of the tubular means 54 being welded to the members 68 and 69 at the region of the notches 71 to form a sealed connection with each of the members to accommodate circulating cooling fluid or liquid.

Figure 7:
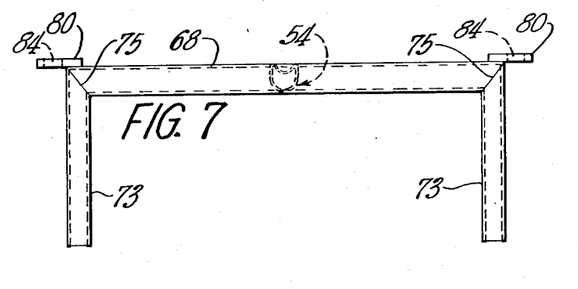
FIG. 7 is an end view of the arrangement shown in FIG. 6.

As shown in FIGS. 4 and 7, the tubular support means 54 and the tubes 68 and 69 are in substantially the same horizontal plane and form an H-shaped configuration. In the arrangement shown in FIGS. 3 through 7, the end regions of the tubular member 68 are joined with substantially vertically disposed hollow members 73 by miter joints as indicated at 75 in FIG. 7, the abutting portions of the miter joints 75 being welded to provide sealed connections.

Similar vertically disposed hollow members 77 are connected with the end regions of the transversely extending tubular member 69 by welded miter joints of the same character as the joints 75 between the transversely extending member 68 and the vertically disposed hollow members 73 forming fluid tight connections.

The members 73 are connected by conventional tubing (not shown) with a supply of cooling fluid or liquid, such as water under pressure, whereby water flows through the inlets 73 through the transverse tubular member 68 thence lengthwise through the tubular support means or body 54, through transverse member 69 and hollow outlet members 77.

Accurate control of the rate of flow through the tubular support means is attained by conventional valve means (not shown) associated with the tubing connected with the water supply so that the circulating water conveys away just sufficient heat from the region of the feeder floor section and the glass adjacent the body 64 of refractory whereby substantially uniform temperature is maintained across the entire feeder floor section thus eliminating concentration or excess of heat in the zone contacted by the rod or body 64 of refractory.

The temperature of the tubular support member, body or means 54 is maintained sufficiently low so that there is no distortion or sagging of the support means 54 and hence no sagging of the feeder floor section 14. In the embodiment illustrated in FIGS. 1 through 8, the tubes or hollow members 73 form fluid inlets and are connected with a water or other fluid supply under pressure, and the hollow members 77 provide outlets, the water circulating through the support means being conveyed away or through a cooling means and recirculated through the tubular support means.

It is to be understood that the direction of fluid or liquid flow through the support means 54 maybe reversed by utilizing the hollow members 77 as inlets and the hollow members 73 as outlets. The rod or body 64 of refractory electrically insulates the tubular support means 54 from contact with the metal of the feeder floor section.

Means for mounting the H-shaped assemblage of tubular means or members 54, 68 and 69 on the frame 46 are associated with the horizontally-disposed transversely-extending tubes 68 and 69. Means are provided attached to or engaged with the end regions of tubes 68 and 69 for mounting the tubular support assemblage or arrangement. Attached to the end regions of each of the tubular members or tubes 68 and 69 by welding or other means are mounting means, members or plates 80 as shown in FIGS. 3, 4, 6 and 7.

Each of the plates 80 is provided with a slot or opening 84, particularly shown in FIG. 6, the slots or openings accommodating securing bolts 86 threaded into openings in the bushing mounting frame 46.

Through this arrangement an inexpensive and stable mounting means is provided for the tubular support means for the feeder floor section. Installation or removal of the support arrangement is facilitated through this method of mounting as it simply requires manipulation of four securing bolts 86. The rod 64 of refractory may be provided with lengthwise arranged passages 90 to accommodate thermocouple conductors for a temperature indicating instrumentality.

The hollow support means 54, the transversely extending tubular members 68 and 69 and the inlet and outlet tubes 73 and 77 are fashioned of a metal or alloy of a character which tends to minimize the deposition or accumulation of scale or solid material precipitated from additives in the water circulated through the assemblage.

As an example of metal for fabricating the tubular assembly, Inconel 600 may be used which is an alloy comprising about 78% nickel, 14% chronium, 6% iron and minor amounts of copper, silicone and carbon. Another metal alloy that may be used is Monel metal, an alloy comprising about 60% nickel and 40% copper. By utilization of a metal alloy of this character, there is a minimum tendency of clogging of the passages in the feeder floor support assembly.

It is desirable to increase the viscosity of the glass of the streams adjacent the exterior of the orifices of the tips or projections 16 in order to satisfactorily attenuate fine filaments or fibers from the streams. Conventional means is provided for conveying heat away from the glass of the streams to raise the viscosity. As shown in FIGS. 1 and 4, hollow members or manifolds 92 are disposed at opposite sides of the glass streams extending lengthwise of and beneath the stream feeder 10. The manifolds are supported by means (not shown) such as the means shown in U.S. Pat. No. 3,334,981.

Extending laterally from the manifolds 92 are members or fins 94, each fin extending between adjacent transversely arranged rows of glass streams 18, as shown in FIG. 4, the fins being fused or welded to the manifolds. The manifolds 92 accommodate a circulating cooling fluid such as water. The fins 94 withdraw heat from the streams of glass, the heat being conveyed away by the circulating fluid. Through this arrangement, the withdrawal or transfer of heat from the streams of glass increases the viscosity of the glass to promote efficient attenuation of the streams to filaments or fibers.

The circulation of cooling fluid, such as water, through the tubular support means 54 is regulated by conventional valve means (not shown). The amount of heat conducted from the feeder floor through the rod 64 of refractory to the support means 54 and conveyed away by the cooling liquid is such that the region of the feeder floor section 14 contacting the rod 64 of refractory does not appreciably exceed the temperature of the remainder of the feeder floor section so that a stable viscosity of the glass is maintained at the feeder floor area.

FIG. 9 illustrates a modified cross sectional configuration of a support means for a stream feeder floor section. The feeder floor tubular support means or body 98 is of substantially rectangular cross section having substantially parallel side walls 100 and a bottom wall 102. The upper wall 104 has an arcuate portion 105 recessed or depressed inwardly, the recess or depression accommodating a rod or elongated member 64a of refractory of circular cross section which is accommodated or nested in the recess provided by the arcuate portion 105.

The upper surface of the rod of refractory engages the lower surface of the feeder floor section 14a. The tubular support means 98 illustrated in FIG. 9 is utilized with transversely extending tubes similar to the tubes 68 and 69 to form an H-shaped unit of a configuration of the character illustrated in FIG. 6.

Such assembly with the feeder floor support means 98 is equipped with means such as the members 80 for attachment to the feeder or bushing mounting frame 46 shown in FIGS. 3 and 4. The tubular support means 98 is commercially available in rectilinear tubular cross section and requires only one operation to depress the upper wall 104 to form the recess accommodating the rod 64a of refractory.

FIG. 10 illustrates a modification of support means for a feeder floor section. The support means 54b is of a cross section substantially identical with the cross section of the tubular support means 54 shown in FIG. 5. In the form shown in FIG. 10, the longitudinal central region of the metal stream feeder floor section 108 is fashioned with a raised portion 110 providing a longitudinal recess 111.

Disposed between the upper arcuate portion 60b of the support means 54b and the lower surface of the raised portion 110 of the feeder floor is a rod 112 of refractory of the same character as the refractory rod 64 except of slightly larger diameter in cross section. By reason of the use of the rod 112 of increased diameter, the apices 114 at the juncture of the arcuate portion 60b with the side walls engage the rod 112.

In such arrangement, the heat is conducted from the raised portion 110 of the feeder floor section 108 through the rod 112 of refractory to the apices 114 and the heat conveyed away by circulating cooling fluid, such as water, through the tubular support means 54b. If an increased area of contact is desired between the rod 112 and the tubular support means 54b, the arcuate upper portion 60b may be of the same curvature as the exterior surface of the rod 112.

FIG. 11 illustrates a form of the tubular support means in association with a modified form of stream feeder floor section. The stream feeder 118 is provided with a feeder floor section 120, the feeder floor section 120 being fashioned with orifices 122 through which flow streams of glass contained in the stream feeder. The surfaces of the floor are planar and there are no depending projections on the feeder floor.

The support means 54c has an arcuate upper portion 60c providing a recess which accommodates a rod 64 of refractory which is coextensive lengthwise with the tubular support means 54c. The upper surface region of the rod 64c engages an unperforated central portion 124 of the feeder floor. Cooling fluid, such as water, is circulated through the support means 54c to convey away heat from the central region 124 of the stream feeder 118 as in the arrangement shown in FIGS. 1 through 8.

Figure 12:
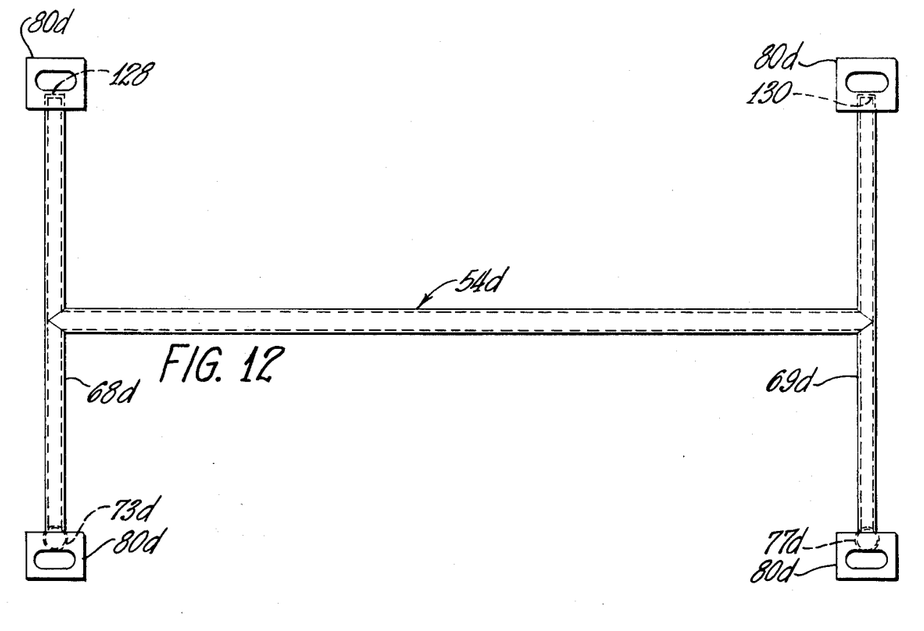
FIG. 12 is a plan view showing a modification of feeder floor support means.

FIG. 12 is a view similar to FIG. 6 illustrating an arrangement modifying the flow path of circulating fluid in an H-shaped support assembly for a stream feeder floor section. In this form the tubular support means or body 54d is connected with transversely-extending horizontally-disposed tubular members 68d and 69d. An inlet or tube 73d is connected with one end of the tubular member 68d, and an outlet or tube 77d connected with one end of the tubular member 69d.

The other end of tube 68d is closed by a member, plug or closure 128, and the other end of the tubular member 69d is closed by a similar member or closure 130. One end of each of the tubular members 68d and 69d is provided with a mounting member or plate 80d for attachment of the H-shaped assembly to the stream feeder mounting frame in the manner illustrated in FIGS. 3 and 4.

In the use of the support assembly illustrated in FIG. 12, water or other fluid is circulated from the inlet 73d through a portion of tubular member 68d thence through the tubular support means 54d through a portion of the tubular member 69d to the outlet 77d. It is to be understood that the fluid, such as water, may be circulated in the opposite direction through the tubular support means 54d and thus the outlet 77d becomes the inlet and the inlet 73d becomes the outlet.

Figure 13:
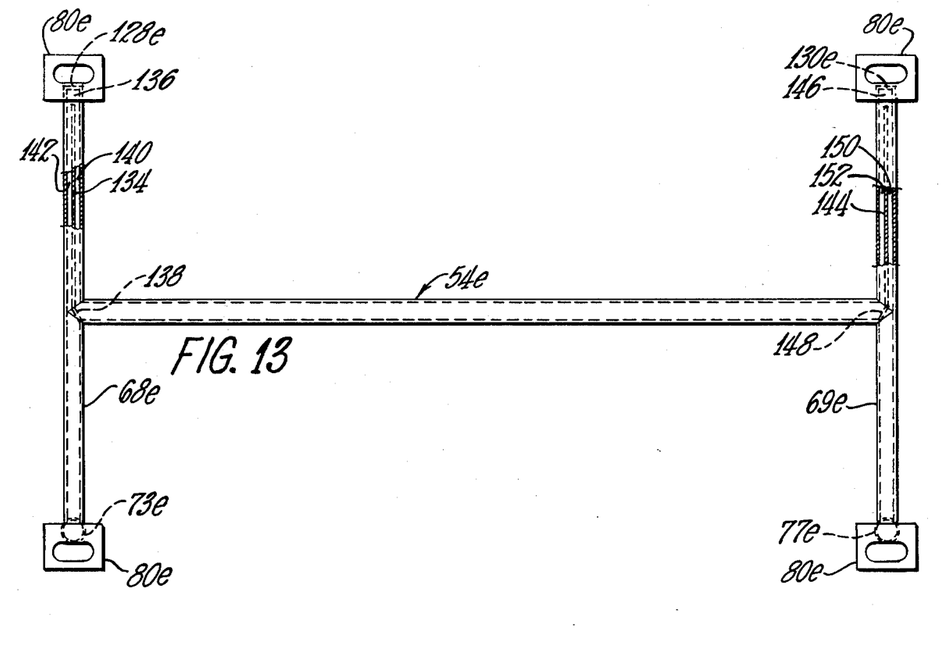
FIG. 13 is a further modification of the feeder floor support means.

FIG. 13 illustrates another form of H-shaped support means assembly for a stream feeder floor section. In this form the feeder floor support means or tubular body 54e has its ends connected respectively with intermediate regions of transversely extending tubular members 68e and 69e. One end of the tubular member 68e is connected with an inlet tube 73e and one end of the tubular member 69e connected with an outlet tube 77e.

The other end of the tubular member 68e is closed by a member or closure 128e, and the other end of tubular member 69e is closed by a member or closure 130e. Extending lengthwise within a portion of tubular member 68e adjacent the closure 128e is a baffle, partition or wall 134. The end of the baffle adjacent the closure member 128e is spaced therefrom to provide a passage 136, the baffle being disposed in a vertical plane in the central region of the tubular means 68e.

The other end of the baffle or wall 134 is provided with an angular portion or deflector 138 which is joined with the juncture of an end portion of the support means 54e and an adjacent wall portion of tubular means 68e to provide two passageways or channels 140 and 142 in a portion of the tubular means 68e.

Extending lengthwise within a portion of the tubular member 69e adjacent the closure 130e is a baffle, wall or partition 144. The end of the baffle adjacent the closure 130e is spaced therefrom to provide a passage 146, the baffle being disposed in a vertical plane in the central region of a portion of the tubular means 69e. The other end of the baffle or wall 144 is provided with an angular portion or deflector 148 which is joined with the juncture of an end portion of the support menas 54e and adjacent the wall portion of tubular means 69e to provide two passageways or channels 150 and 152 in a portion of the tubular member 69e.

The arrangement shown in FIG. 13 provides for flow of fluid, such as water, in a circulatory path as follows: Water entering the inlet 73e flows transversely through the passage 142 along the left side of the baffle 134 through the passage 136 and passage 140 at the right side of the baffle 134 in tubular member 68e. The water is deflected by the portion 138 of the baffle 134 into the tubular support means 54e in a right-hand direction.

The baffle portion 148 of the baffle 144 in the tubular means 69e deflects the water through the passage 152 at the left side of the baffle 144, through the end passage 146 thence through the passage 150 at the right side of the baffle 144 to the outlet 77e. Through the arrangement shown in FIG. 13, the water flows through the assembly in a continuous path through all portions of the transversely extending tubes 68e and 69e and through the tubular support means 54e, the arrangement or assembly utilizing one inlet and one outlet for the circulating water.

The end regions of the transversely extending tubular members 68e and 69e are provided with mounting members or plates 80e for attaching the support assembly shown in FIG. 13 to the stream feeder mounting frame 46 in the manner shown in FIGS. 3 and 4.

The tubular components of the feeder floor support assemblies illustrated in FIGS. 12 and 13 may be made of metals or alloys of the character hereinbefore mentioned in connection with the support means assembly shown in FIGS. 1 through 8.

It is apparent that, within the scope of the invention, modifications and different arrangements may be made other than as herein disclosed, and the present disclosure is illustrative merely, the invention comprehending all variations thereof.

We claim:

1. Apparatus for forming fibers from streams of heat-softened mineral material comprising, in combination, a stream feeder having a floor section provided with groups of orifices, means for supporting the stream feeder including a tubular support member extending lengthwise of and beneath the floor section, a body of electrically nonconducting nonmetallic material disposed between and engaging the tubular support member and the feeder floor section, a tubular member adjacent each end of the tubular support member and extending transversely of the tubular support member and in substantial parallelism with the feeder floor section, the ends of the tubular support member being joined with intermediate regions of the transversely extending tubular members, said transversely extending tubular members and the tubular support member accommodating circulating fluid for conveying heat away from the feeder floor section.

2. The apparatus of claim 1 wherein a first transversely extending tubular member provides a fluid flow passage into the tubular support member, and a second transversely extending tubular member provides a passage conveying fluid away from the tubular support member.

3. The apparatus of claim 1 wherein the tubular support member and the transversely extending tubular members are substantially disposed in a horizontal plane.

4. The apparatus of claim 1 comprising means for supporting the transversely extending members including plates secured to the end regions of the transversely extending members.

5. The apparatus of claim 1 wherein one end of each of the transversely extending tubular members is closed.

6. The apparatus of claim 1 wherein an upper wall portion of the tubular support member is configurated to form a recess, said recess accommodating the body of electrically nonconducting nonmetallic material.

7. The apparatus of claim 1 wherein the body of electrically noncoducting nonmetallic material is a rod of refractory of substantially circular cross section.

8. Apparatus for forming fibers from streams of heat-softened mineral material comprising, in combination, a frame, a stream feeder mounted by the frame, said stream feeder having a floor section provided with stream flow orifices, a support arrangement for the feeder floor section including a tubular support means extending lengthwise of and beneath the floor section, an upper wall region of the tubular support means having a recess, a body of substantially circular cross section of electrically nonconducting refractory disposed in the recess in the tubular support means, said body being in engagement with a surface of the feeder floor section, a tubular member adjacent each end of the tubular support means and extending transversely of the tubular support means and in substantial parallelism with the feeder floor section, the ends of the tubular support means being joined with the transversely extending members intermediate their ends forming an H-shaped configuration, said transversely extending tubular members and tubular support means accommodating circulating fluid for conveying away heat from the feeder floor section, and means engaging the transversely extending tubular members for attaching the members to the feeder mounting frame.

9. Apparatus for forming fibers from streams of heat-softened mineral material comprising, in combination, a frame, a stream feeder mounted by the frame, said stream feeder having a floor section provided with stream flow orifices, a support arrangement for the feeder floor section including tubular means extending lengthwise of and beneath the floor section, a body of substantially circular cross section of electrically nonconducting refractory disposed between and engaging the tubular means and the floor section, a tubular member extending horizontally laterally of the tubular means adjacent each end of the tubular means, the ends of the tubular means being joined with intermediate regions of the tubular members, a fluid inlet connected with on tubular member, a fluid outlet connected with the other tubular member, said tubular means and tubular members accommodating circulating cooling fluid, and mounting means adjacent the end regions of the tubular members for attaching the tubular members to the feeder mounting frame.

10. Apparatus for forming fibers from streams of heat-softened glass comprising, in combination, a frame, a stream feeder mounted by the frame, said stream feeder having a floor section provided with stream flow orifices, a support arrangement for the feeder floor section including a tubular support member extending lengthwise of and beneath the floor section, a body of substantially circular cross section of electrically nonconducting nonmetallic material disposed between and engaging the tubular support member and the feeder floor section, a tubular member adjacent each end of the tubular support member and extending transversely horizontally of the tubular support member, the ends of the tubular support member being joined with an intermediate region of each of the transversely extending tubular members, one end of each of the transversely extending members being closed, a partition disposed within each of the transversely extending tubular members between the connection of the transversely extending tubular member with the tubular support member and the closed end of the tubular member, the ends of the partitions being spaced from the closed ends, said tubular members and tubular support member accommodating circulating fluid, the partitions in the transversely extending tubular members providing for fluid flow in opposite directions in the portions of the tubular members between the tubular support member and the closed ends of the tubular members, and means engaging the transversely extending tubular members for attaching said members to the feeder mounting frame.

11. Apparatus for forming fibers from streams of heat-softened glass comprising, in combination, a frame, a stream feeder mounted by the frame, said stream feeder having a floor section provided with stream flow orifices, a support arrangement for the feeder floor section including a tubular support member extending lengthwise of and beneath the floor section, an upper wall portion of the tubular support member being configurated to provide a recess, a rod of electrically nonconducting refractory disposed in the recess and engaging the feeder floor section, a tubular member adjacent each end of the tubular support member and extending horizontally transversely of the tubular support member, the ends of the tubular support member being joined with the transversely extending tubular members, said transversely extending tubular members and the tubular support member accommodating circulating fluid for conveying heat away from the feeder floor section, a hollow member depending from each of the transversely extending tubular members, the hollow member depending from one transversely extending tubular member providing a fluid inlet, the tubular member depending from the other transversely extending tubular member providing a fluid outlet, and means engaging the transversely extending members for attaching the said members to the feeder mounting frame.

12. The apparatus of claim 11 wherein the means engaging the transversely extending members comprises plates welded to the transversely extending members, said plates having openings for receiving securing means.

13. Apparatus for forming fibers from streams of heat-softened glass comprising, in combination, a frame, a stream feeder mounted by the frame, said stream feeder having a floor section provided with stream flow orifices, a support arrangement for the feeder floor section including a tubular support member extending lengthwise of and beneath the floor section, an upper wall portion of the tubular support member being configurated to provide a recess, a rod of electrically nonconducting refractory disposed in the recess and engaging the feeder floor section, a tubular member adjacent each end of the tubular support member and extending transversely of the tubular support member and in substantial parallelism with the feeder floor section, the ends of the tubular support member being joined with mid regions of the transversely extending tubular members, said transversely extending tubular members and the tubular support member accommodating circulating fluid for conveying heat away from the feeder floor section, a hollow member depending from each of the ends of the transversely extending tubular members, the hollow members depending from one transversely extending tubular member providing fluid inlet means, and the tubular members depending from the other transversely extending tubular member providing fluid outlet means.

* * * * *